(12) United States Patent
Robens et al.

(10) Patent No.: US 7,724,609 B2
(45) Date of Patent: May 25, 2010

(54) SONIC CUP GUN

(75) Inventors: Wayne Robens, Lakeville, MN (US); Timothy W. Zeigler, Independence, MN (US)

(73) Assignee: Wagner Spray Tech Corporation, Plymouth, MN (US)

( * ) Notice: Subject to any disclaimer, the term of this patent is extended or adjusted under 35 U.S.C. 154(b) by 1247 days.

(21) Appl. No.: 11/257,741

(22) Filed: Oct. 25, 2005

(65) Prior Publication Data

US 2006/0040044 A1 Feb. 23, 2006

Related U.S. Application Data

(63) Continuation-in-part of application No. 10/809,048, filed on Mar. 25, 2004, now Pat. No. 7,244,464.

(51) Int. Cl.
C23C 16/52 (2006.01)
G01S 15/88 (2006.01)

(52) U.S. Cl. ............................................. 367/99; 427/8

(58) Field of Classification Search ................... 367/99, 367/107, 108, 111, 112; 427/8
See application file for complete search history.

(56) References Cited

U.S. PATENT DOCUMENTS

| | | | |
|---|---|---|---|
| 1,349,336 A | 8/1920 | Haddock | |
| 2,376,836 A | 5/1945 | Tunnicliffe | |
| 3,117,480 A | 1/1964 | Peddinghaus | |
| 3,731,743 A | 5/1973 | Marshall | |
| 3,878,811 A | 4/1975 | Rombach | |
| 4,291,839 A | 9/1981 | Brett | |
| 4,427,880 A | 1/1984 | Kanade et al. | |
| 4,444,495 A | 4/1984 | Bramwell et al. | |
| 4,501,223 A | 2/1985 | Matsuno et al. | |
| 4,556,815 A | 12/1985 | Ohhashi et al. | |
| 4,644,512 A * | 2/1987 | Grilk | 367/112 |
| 4,702,931 A | 10/1987 | Falcoff | |
| 4,836,671 A | 6/1989 | Bautista | |
| 4,972,798 A | 11/1990 | Ando et al. | |
| 4,982,897 A | 1/1991 | Matusita et al. | |
| 4,995,010 A * | 2/1991 | Knight | 367/111 |

(Continued)

FOREIGN PATENT DOCUMENTS

AT 224238 T 10/2002

(Continued)

OTHER PUBLICATIONS

Laser Touch® Laser Guided Finish, information from brochure, Laser Touch & Technologies™, LLC, 2 pgs.

(Continued)

*Primary Examiner*—Dan Pihulic
(74) *Attorney, Agent, or Firm*—Faegre & Benson LLP (57) ABSTRACT

A paint spray gun and range finder for positioning the gun with respect to a target surface to be sprayed. The range finder provides a user of the gun with information about the distance between the gun and the target surface, with different indications when the gun is too close, too far or distanced properly from the target surface to be sprayed. An acoustic range finder provides visual indications of the proximity of the gun to the target surface. Visual indications include a digital display of the distance from the target surface and may be frozen while the gun is spraying.

21 Claims, 15 Drawing Sheets

U.S. PATENT DOCUMENTS

| | | | |
|---|---|---|---|
| 5,152,841 | A | 10/1992 | Medler et al. |
| 5,160,086 | A | 11/1992 | Kuykendal et al. |
| 5,302,207 | A | 4/1994 | Jurcisin |
| 5,327,218 | A | 7/1994 | Igaki |
| 5,369,486 | A | 11/1994 | Matsumoto et al. |
| 5,598,972 | A | 2/1997 | Klein, II et al. |
| 5,757,498 | A | 5/1998 | Klein, II et al. |
| 5,857,625 | A | 1/1999 | Klein et al. |
| 5,868,840 | A | 2/1999 | Klein, II et al. |
| 5,951,296 | A | 9/1999 | Klein |
| 6,301,997 | B1 | 10/2001 | Welte |
| 6,557,815 | B1 | 5/2003 | Klein, II |
| 6,846,077 | B2 | 1/2005 | Bich et al. |
| 7,244,464 | B2 * | 7/2007 | Robens et al. ............ 427/8 |
| 2005/0214444 | A1 * | 9/2005 | Robens et al. ............ 427/8 |
| 2006/0040044 | A1 * | 2/2006 | Robens et al. ............ 427/8 |

FOREIGN PATENT DOCUMENTS

| | | |
|---|---|---|
| AT | 258466 T | 2/2004 |
| DE | 3148293 | 7/1983 |
| DE | 69623780 T | 5/2003 |
| DE | 69821357 T | 12/2004 |
| EP | 0115710 | 8/1984 |
| EP | 0211372 | 2/1987 |
| FR | 2517567 | 6/1983 |
| JP | 05-154422 | 6/1993 |
| JP | 06-163499 | 6/1994 |
| NZ | 313454 | 4/1999 |
| WO | WO 97/03759 | 2/1997 |
| WO | 2004002751 | 1/2004 |
| WO | WO 2007079274 A2 * | 7/2007 |

OTHER PUBLICATIONS

"Laser Guiding Device Points to Material Saving", Iowa Waste Reduction Center, www.iwrc.org/programs/ltarticle.cfm, 2 pgs.

ETV Joint Verification Statement, The Environmental Technology Verification Program, 6 pgs.

Angus Technology Limited, http://www.angus.com.hk/c-nt.htm, 3 pgs.

Elan Microelectronics Newsletter, Mar. 2004, http://www.elan-europe.com/Newsletter/Elan_News_March_2004.htm, 3 pgs.

International Search Report and Written Opinion of International Application No. PCT/US2006/060114, filed Oct. 20, 2006, both mailed Jul. 9, 2007.

* cited by examiner

SONIC CUP GUN

CROSS REFERENCE TO RELATED APPLICATION

This application is a Continuation-In-Part of application Ser. No. 10/809,048 filed Mar. 25, 2004 and titled Spray Gun with Range Finder, the entire contents of which are hereby incorporated by reference.

BACKGROUND OF THE INVENTION

This invention relates to the field of spray guns, particularly, hand held spray guns suitable for spraying paint and similar coatings. Prior art spray guns relied upon user judgment to position the gun with respect to a target surface to be painted. Typically, user manuals advised the user to hold the gun such that a central axis of the spray pattern remains perpendicular to and at a constant distance from the target surface to be sprayed. The vast majority of target surfaces to be sprayed are at least generally planar. Varying the distance between the spray gun and the target surface ordinarily results in uneven coverage and may result in some regions having less than full coverage, while other regions receive excess sprayed material, which may result in sags and or runs.

BRIEF SUMMARY OF THE INVENTION

The present invention provides an aid to a user in maintaining the proper distance between the spray gun and the target surface by providing a range finder with the spray gun to provide the user with information regarding the distance between the gun and the target surface.

In one embodiment, the range finder provides a reading of the distance information to the user before the gun is triggered for spraying, and freezes the reading when the gun is spraying.

In one aspect, the present invention provides a visually perceptible digital display which may be in the form of a numerical readout of the distance measured.

DETAILED DESCRIPTION OF THE INVENTION

Figure 1:
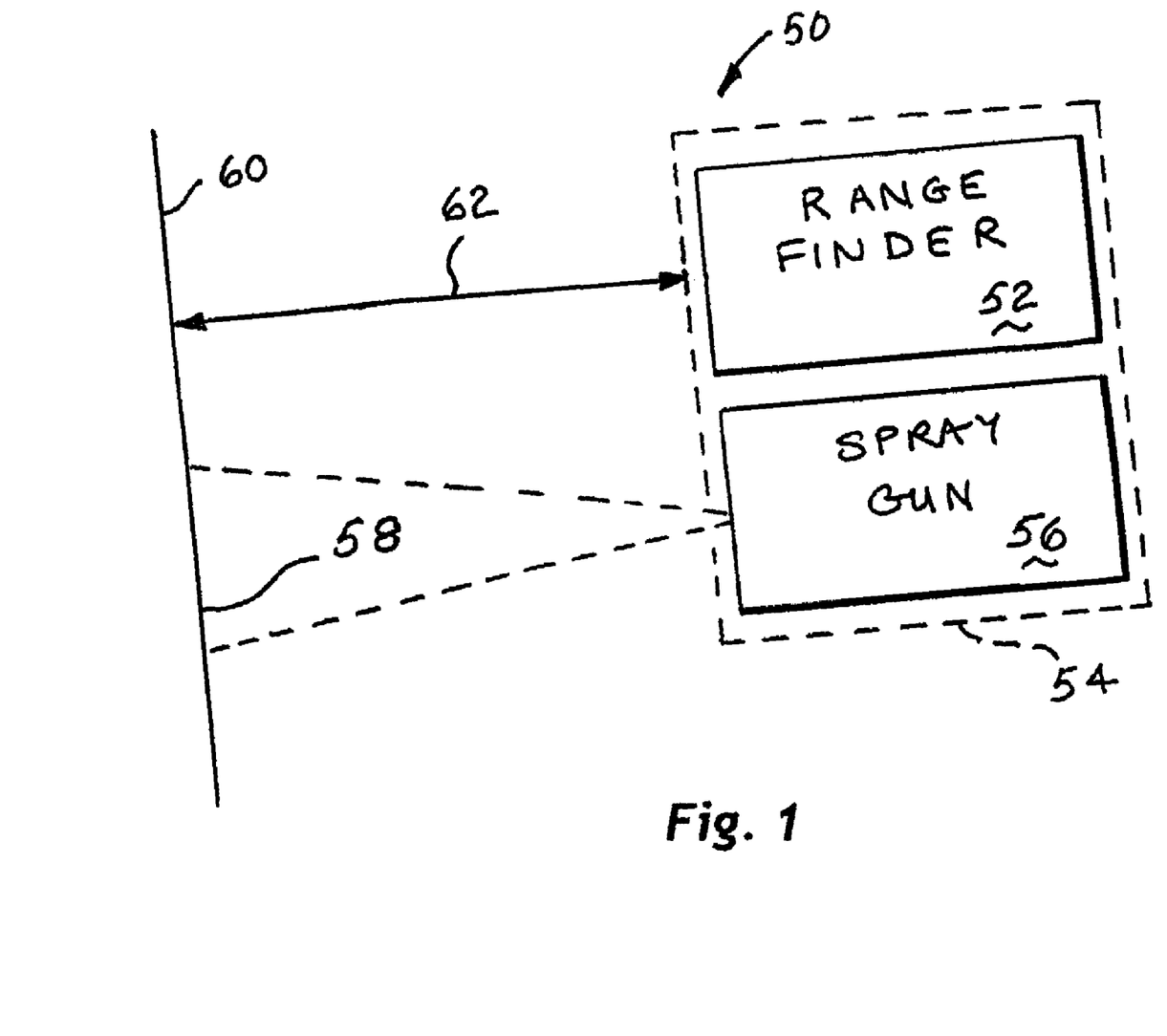
FIG. 1 is a simplified block diagram of a combination of a range finder and spray gun according to the present invention.

Referring now to the Figures, and most particularly to FIG. 1, a simplified block diagram 50 of the present invention may be seen. A range finder 52 may be combined in an assembly 54 with a spray gun 56, where the spray gun is of the type for spraying paint and similar coatings. When selectively triggered, the spray gun 56 provides a spray pattern 58 to apply the coating to a target surface 60, indicated schematically by a line in FIG. 1. It is to be understood that the target surface 60 is often a generally planar surface, but it is to be understood that the term "target surface" as used herein may apply to any geometrically shaped surface to be coated, with the planar surface merely used by way of example.

It is to be further understood that the range finder 52 provides a user of the gun 56 with information about the distance 62 between the gun assembly 54 and the target surface 60. The information about distance 62 is preferably provided in terms of how far the spray gun 56 is from the target surface, such that the range finder may be calibrated to enable or assist a user to position the gun 56 at a desired distance, typically within a range of about 4 inches to about 12 inches from the target surface 60. More particularly, in connection with one model of spray gun, the desired distance may be measured from the atomizing tip exit surface 64 (see FIGS. 2, 3 and 4) to the target surface 60. It is to be understood that distances other than in the range of about 4 to about 12 inches may be chosen to be the "desired distance," as that term is used herein. For example, some coatings may be advantageously applied at a desired distance other than in the range of 4 to 12 inches, or an alternative tip or gun may be designed to be used at some other "desired distance" from the target surface.

Figure 2:
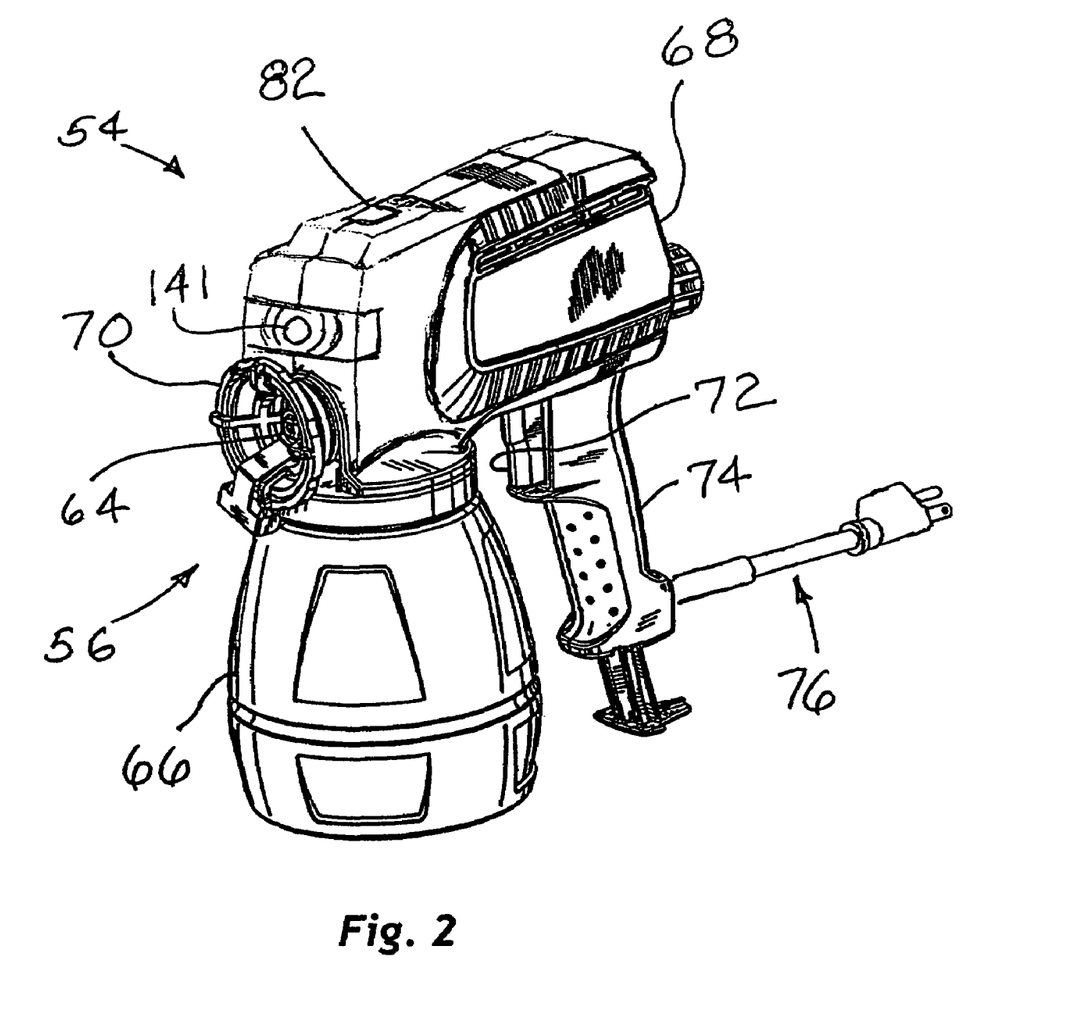
FIG. 2 is a perspective view of the combined range finder and spray gun of the present invention.
Figure 4:
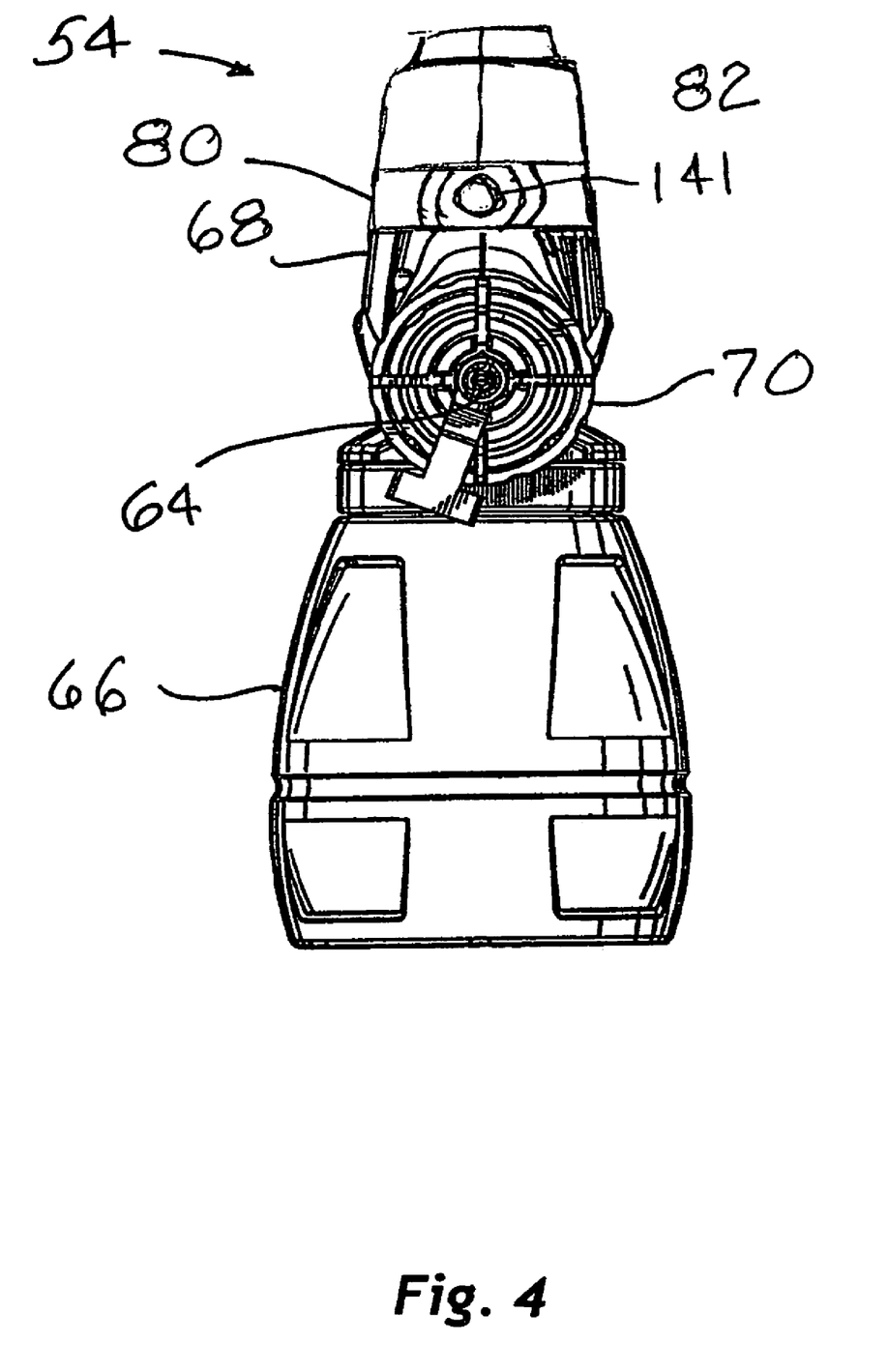
FIG. 4 is a front view of the combined range finder and spray gun shown in FIG. 2.

Referring now most particularly to FIGS. 2 and 4, the spray gun 56 included in assembly 54 may include a material reservoir 66 attached to a housing 68. A spray tip 70 delivers atomized coating material from the reservoir 66 in a spray pattern 58 when the gun 56 is activated by pulling on a trigger 72. Spray gun 56 is directed by a user grasping a handle 74 to position and control the gun 56. The gun 56 and range finder 52 are preferably electrically powered via a cord set 76 and the gun 56 is operative to spray when a trigger 72 is pulled. An ultrasonic acoustic sensor or transceiver 141 for the rangefinder 52 is preferably located on a front surface of the gun 56.

Figure 3:
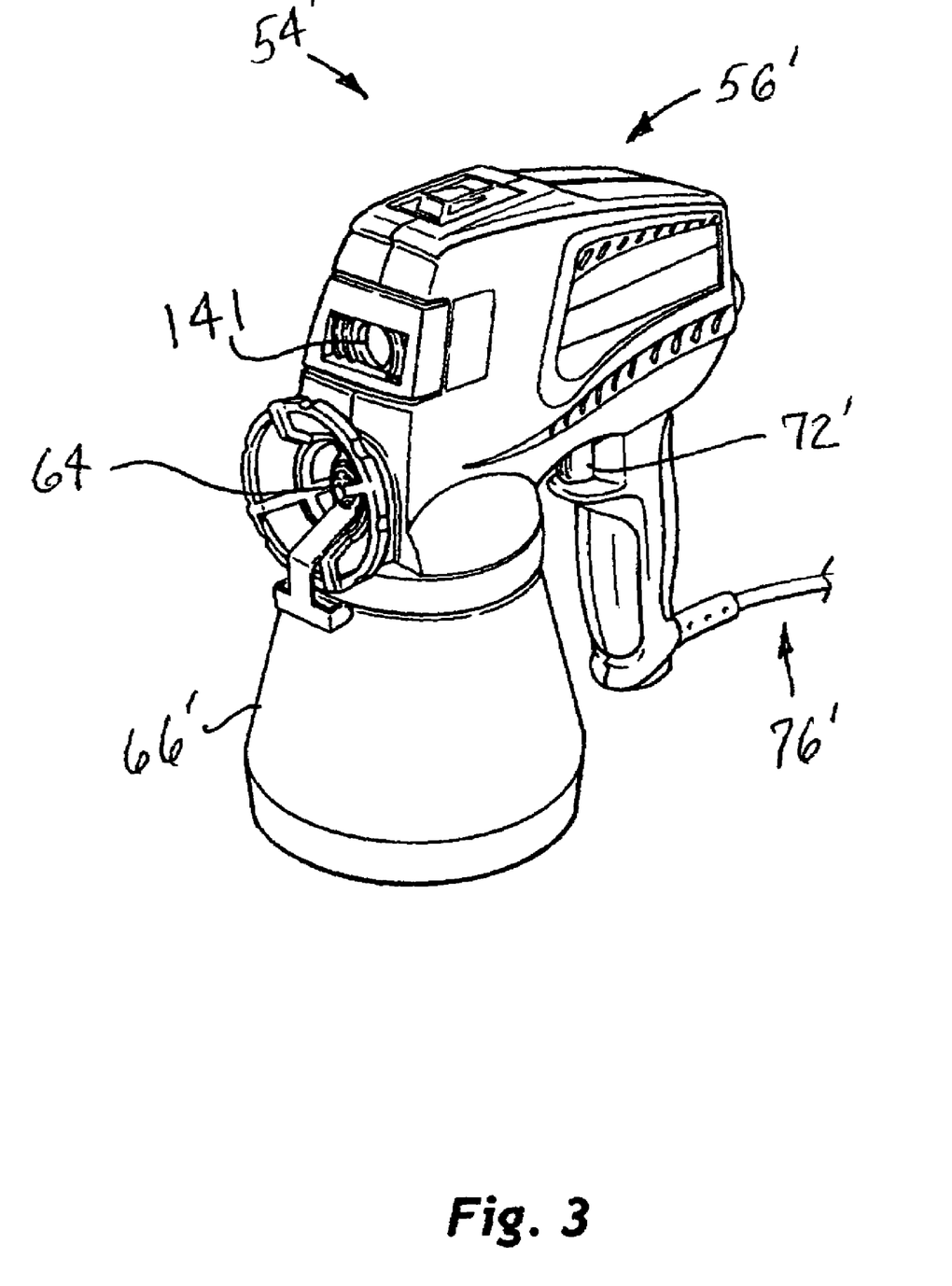
FIG. 3 is a perspective view similar to that of FIG. 2, except with an alternate spray gun in the practice of the present invention.

FIG. 3 shows an alternate spray gun 56' having parts corresponding to those of FIGS. 2 and 4. Gun 56' has a material reservoir 66' and a trigger 72' and a cord set 76'. As shown, the spray tip 70 with its exit surface 64 is identical between the assemblies 54 and 54'. The following remarks are to be understood to apply to the apparatus of FIG. 3 as well as that of FIGS. 2 and 4.

Figure 5:
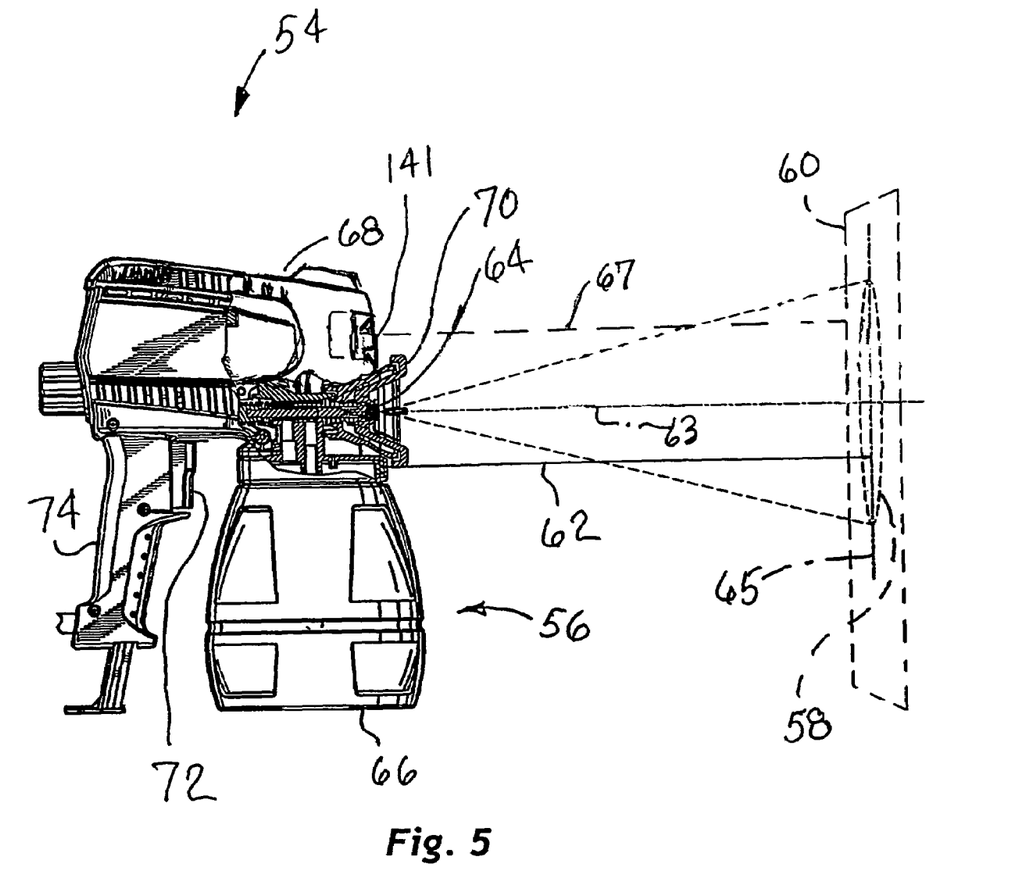
FIG. 5 is a side view of the combined range finder and spray gun of FIG. 2 with a simplified schematic representation of a spray pattern of the gun and a simplified representation of a sonic beam from the range finder directed at a generally planar target surface.
Figure 6:
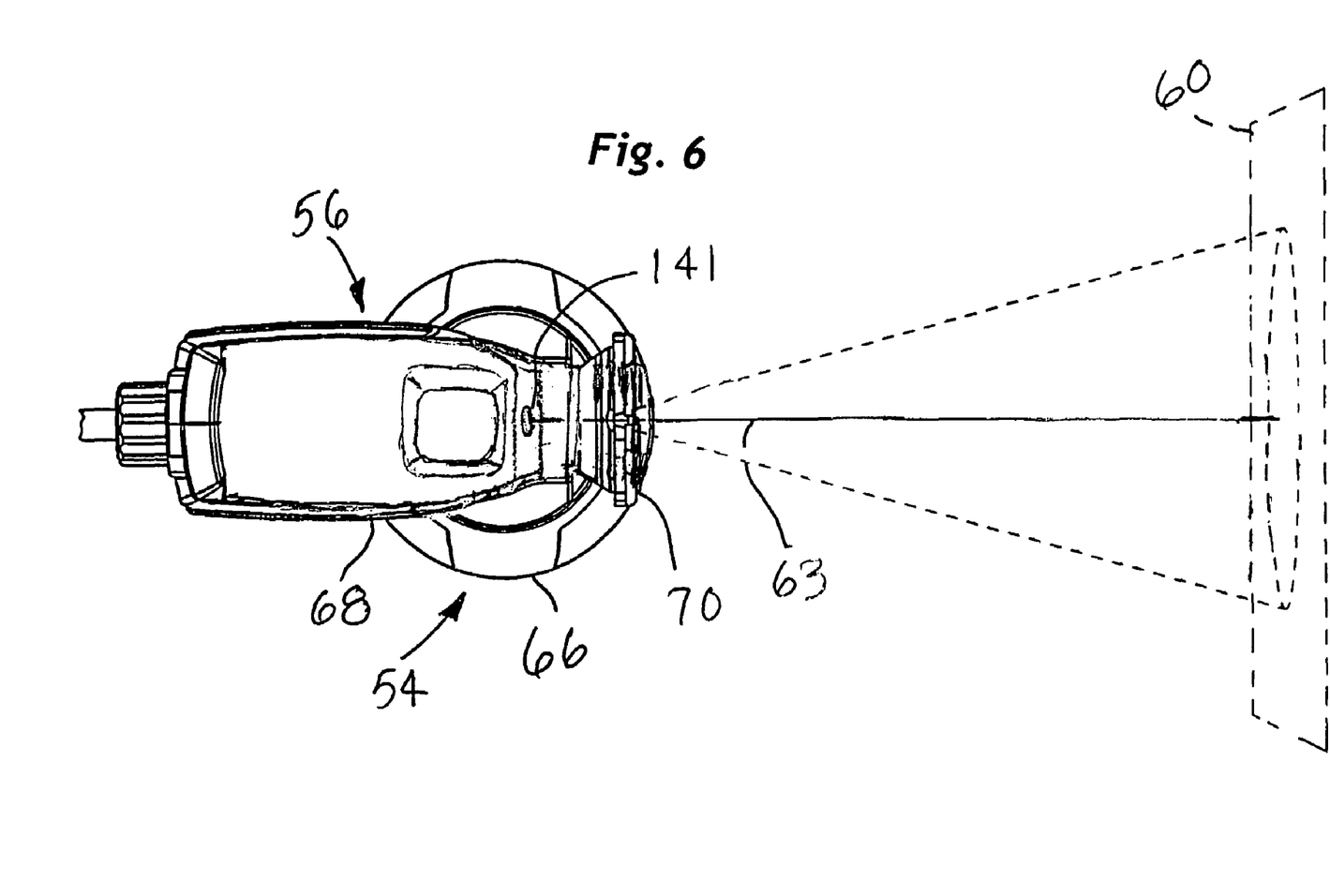
FIG. 6 is a top view corresponding to FIG. 4.

In one embodiment, the range finder 52 is continuously powered when the cord set 76 is connected to a source of electrical power, even though the gun sprays paint only when the trigger is pulled. Referring now also to FIGS. 5 and 6, in order to effectively apply the paint or other coating material, it is preferably that the spray gun 56 be held at a desired distance from the target surface 60 and moved parallel to the target surface 60 as the coating material is applied. It is also preferable that the spray gun 56 be held generally perpendicular to the target surface 60, more particularly, that a central axis 63 of the spray pattern 58 be held generally perpendicular to the target surface 60 as indicated in FIG. 5 where central axis 63 is shown perpendicular to a vertical axis 65 on the target surface 60. Also shown in FIG. 5 is a spray pattern 58. Dashed line 67 in FIG. 5 is a simplified representation of a sonic signal sent from the range finder 52 (more particularly from transceiver 141) to the target surface and reflected back to transceiver 141 to enable the range finder to display information about the distance 62 between the gun 56 and the target surface 60.

In the practice of the present invention, spray gun assembly 54 may include the range finder 52 inside housing 68. In operation, the range finder 52 may be continuously energized, or may be selectively energized by partially activating trigger 72, in either case to provide information to enable the user to position the gun at a desired distance from the target surface initially without energizing spray gun 56 to provide atomized coating material. The spray gun assembly 54 is initially positioned at the desired distance from the target surface by utilizing the information from the range finder and moving the gun toward or away from the surface until the gun is located at the desired distance from the target surface. The trigger 72 may then be fully activated or depressed, causing the gun 56 to emit atomized coating material at which time the gun is preferably moved parallel to the target surface while maintaining the desired distance between the gun and the target surface using the information provided by the range finder 52. In one embodiment, the range finder 52 may be continuously energized when the cord set is connected to electrical power, and depressing the trigger to cause the gun to spray paint will "freeze" the reading of the range finder 52, holding the last distance to the target surface measured before the trigger was depressed. This mode of operation does not measure distance while the gun is spraying, avoiding interference between spraying and range finding. Once the trigger 72 is released spraying stops and the range finder is "released" to an active (measuring) mode, allowing the operator to again observe the distance to the target surface and readjust the location of the gun, if desired, before recommencing spraying (and again freezing the new reading during the recommenced spraying). This mode of freezing the reading during spraying is desirable in that it avoids requiring the range finder 52 to overcome acoustic and or electromagnetic interference which may be created by the operation of the gun 56 atomizing paint in spray pattern 58.

Figure 7:
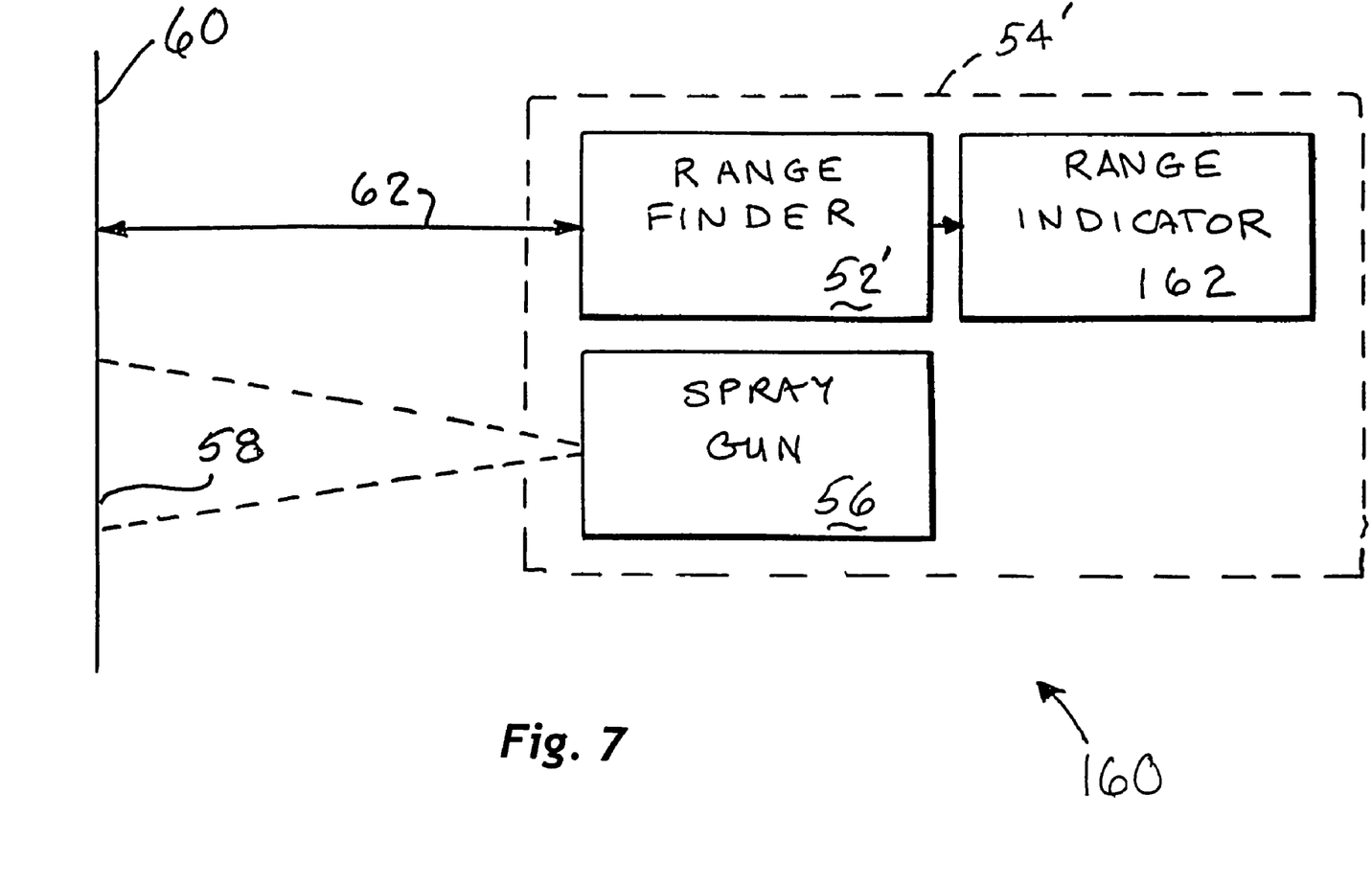
FIG. 7 is a block diagram for embodiments of the present invention which include a range indicator.

Referring now to FIG. 7, a block diagram 160 of the present invention may be seen. In this embodiment, a range indicator 162 is added to the assembly 54, and a range finder 52' provides distance information to the user via a perceptible signal from the range indicator 162.

Figure 8:
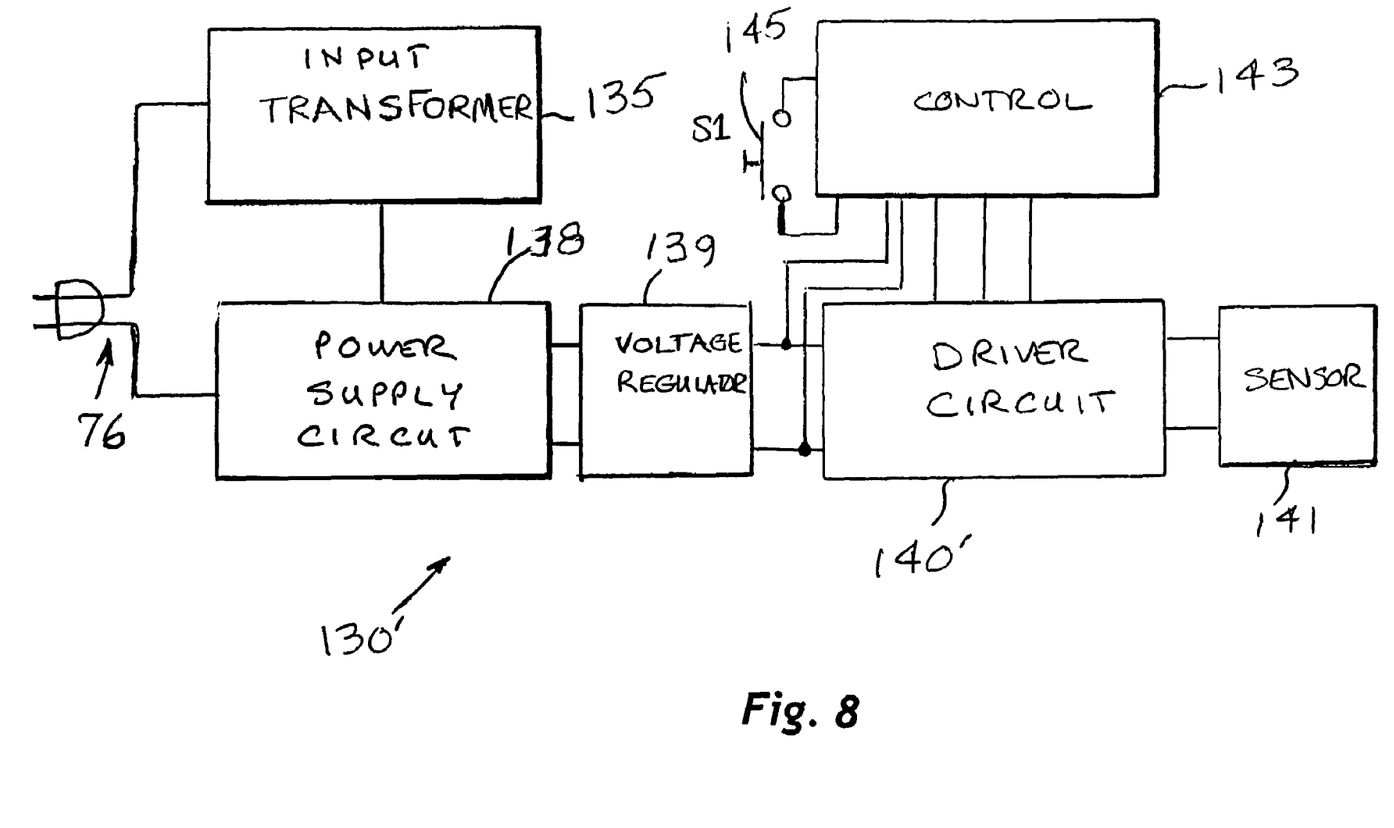
FIG. 8 is a block diagram for a power supply and driver circuit for the sonic range finder of the present invention.

Referring now to FIG. 8, a block diagram 130 of an electrical power supply system for one embodiment of the present invention may be seen. Power is supplied from an AC source or "MAINS" through a cord set 76. An input transformer 135 steps down the voltage for the remaining circuitry. A power supply circuit 138 together with a voltage regulator 139 provide regulated DC power to a driver circuit 140 which operates the sensor or transceiver 141. DC power is also supplied to a control circuit 143. A switch S1, 145 is connected electrically to control circuit 143 and mechanically to trigger 72, such that pulling trigger 72 closes switch S1, 145. Closure of switch S1, 145 tells the control circuit 143 that the gun 56 is operating to spray material, at which time the last distance 62 measured by the range finder 52 is frozen (i.e., maintained) in the range indicator 162. When switch S1, 145 opens, it tells the control circuit 143 that the gun 56 is not then spraying and the range finder 52 is released to continuously measure and indicate the distance to the target surface using the range indicator 162.

Figure 9:
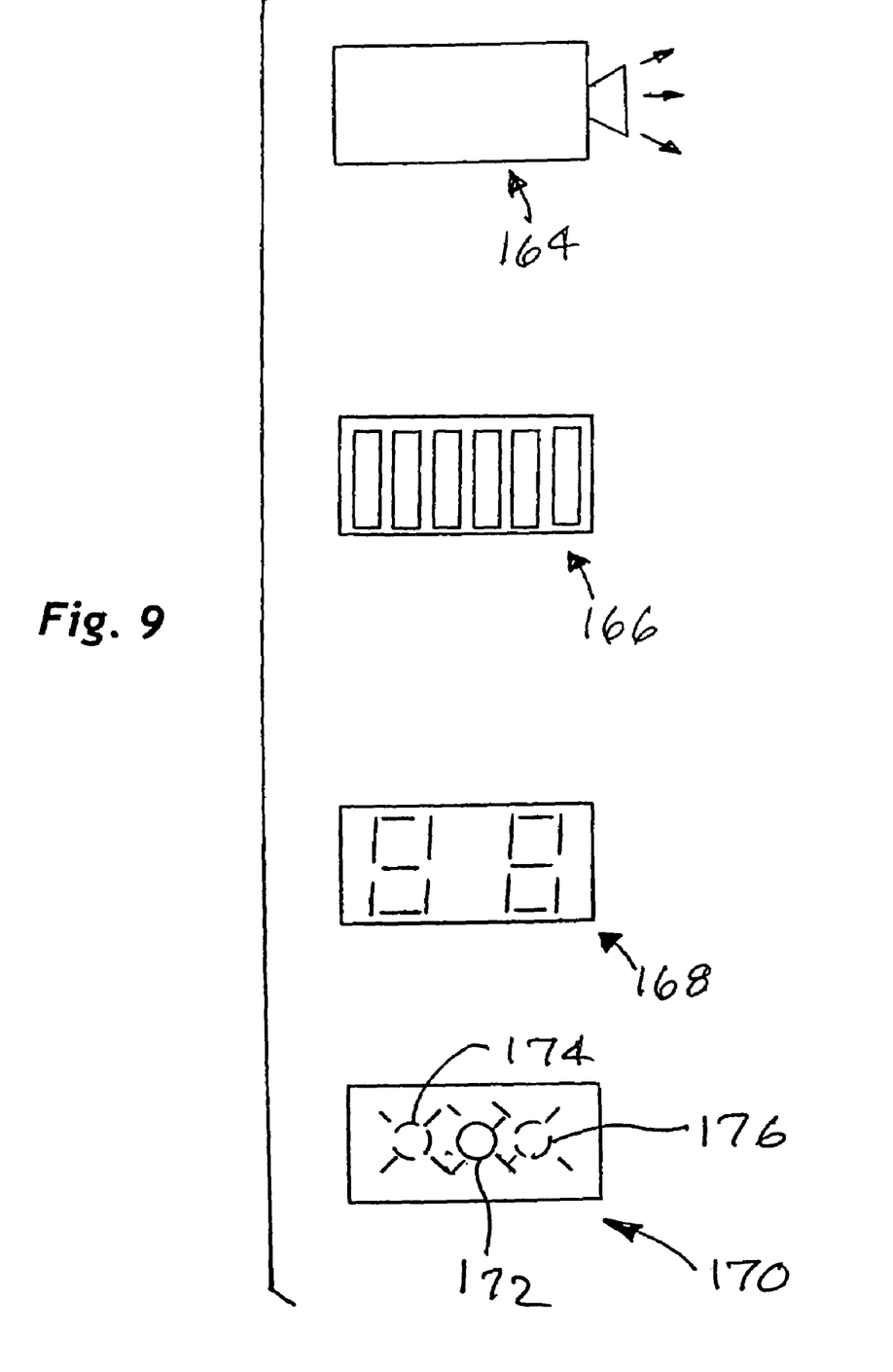
FIG. 9 is a simplified view of various range indicators useful in the practice of the present invention.

As may be seen in FIG. 9, the range indicator 162 may have an audio output device 164 providing an audible output, preferably with three distinguishable states, such as pulsing, steady, warbling, or multiple tones. For example, a high tone followed by a low tone can be used to indicate "move closer" and a low tone followed by a high tone can indicate "move away" and silence can indicate that the gun is at the desired distance. Alternatively, a visual display for the range indicator 162 can take the form of a bar graph display 166, with one or more bars used to indicate the desired correction to make to position the gun at the desired distance. With the example shown, three bars can be illuminated to indicate the gun is at the desired distance and fewer bars illuminated indicating the gun is closer than the desired distance and more bars illuminated indicating the gun is farther than the desired distance from the target surface. If it is preferred to illuminate only one bar at a time, an odd number of bars will allow a median bar to indicate the gun is at the desired distance, while having a symmetrical range of possible indications on either side of that state.

Figure 10:
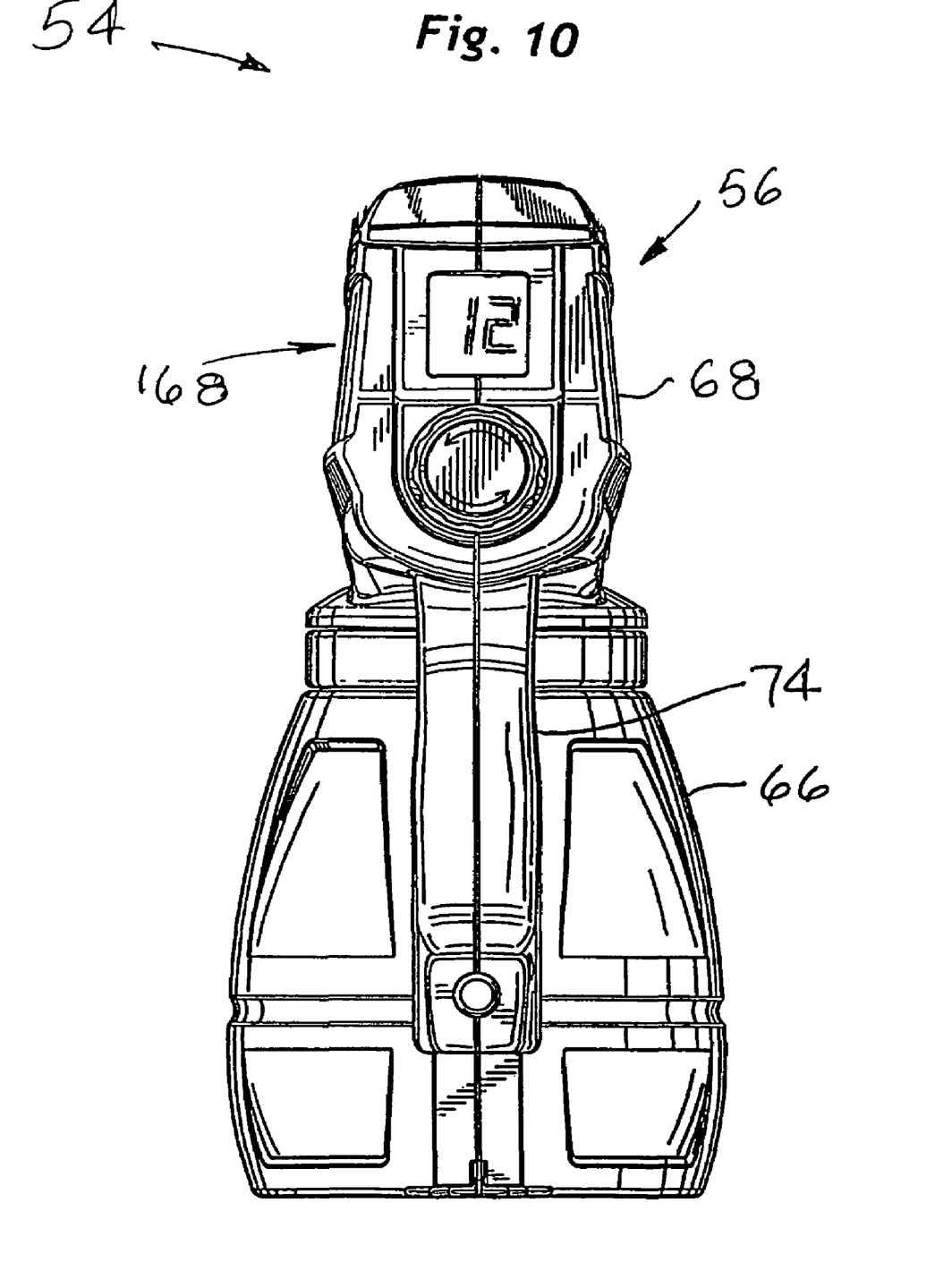
FIG. 10 is a view of the rear of the spray gun with one alternative range indicator.

Other visual range indicators may include a digital display of the distance 62, for example, in inches, with one preferred reading being "12" for example, using a two digit decimal display 168, as shown in FIG. 10. Alternatively, a three state alphabetic message may be displayed, such as indicating "TOO CLOSE" or "OK TO SPRAY" or "TOO FAR AWAY" in place of the two decimal digits.

Figure 11:
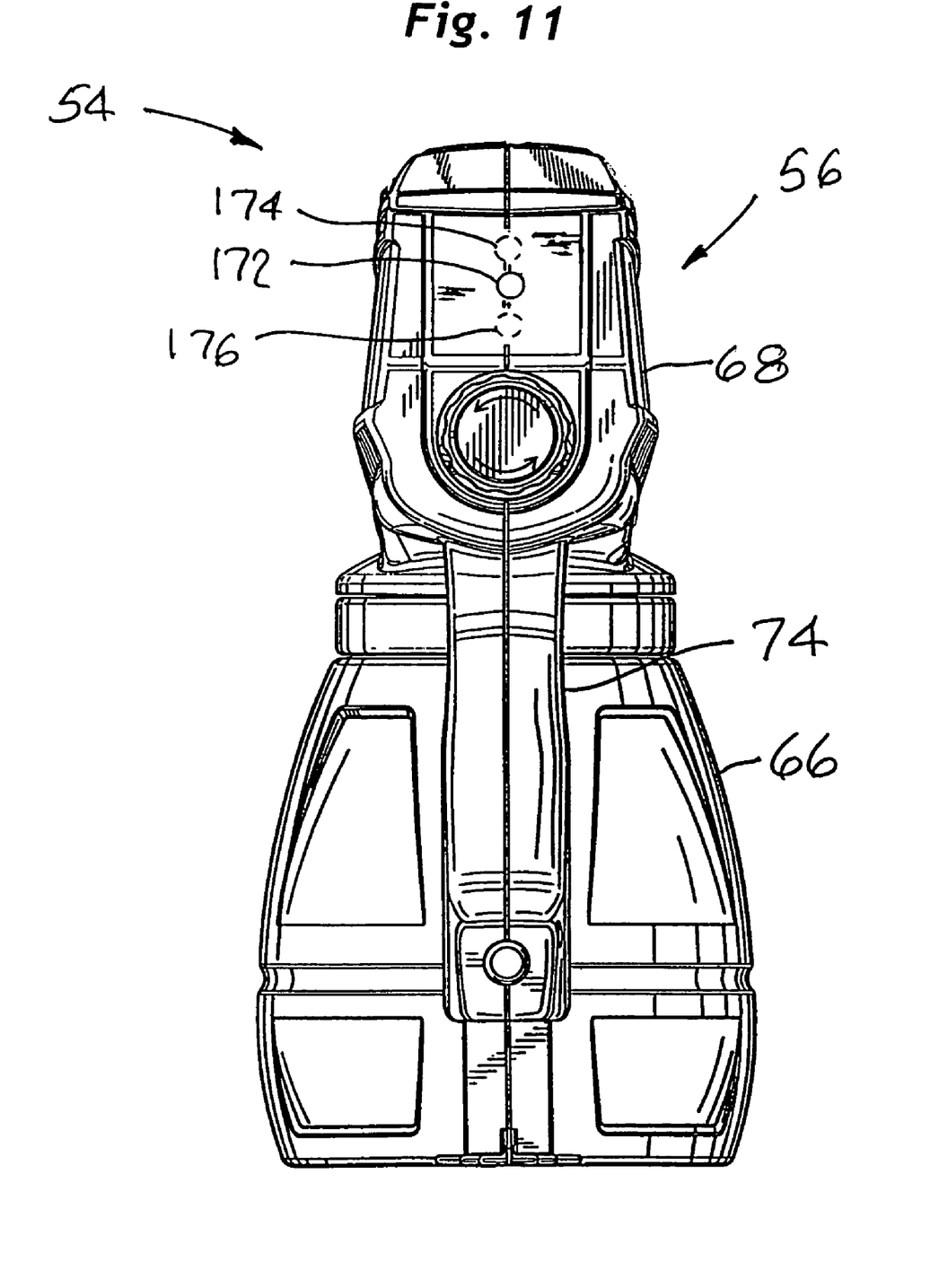
FIG. 11 is a view similar to that of FIG. 10, except illustrating other alternative range indicator embodiments.

Referring now also to FIG. 11, another version of the range indicator 162 may be a single or multiple element visual indicator 170, such as an LED, with three states. With a single LED 172, the LED can be of the type having multiple color outputs with, for example steady RED indicating "too close", flashing RED indicating "too far away" and GREEN indicating "ok to spray." Alternatively, a YELLOW or other color may be used for the third state. With a multiple indicator version, operation similar to the bar graph indicator may be displayed, or only one of the indicators may be illuminated to indicate the relative position of the spray gun with respect to the target surface. In FIG. 11, a single indicator 172 is shown by a solid line, while second and third indicators are shown in dashed lines as optional to this version of the range indicator 162.

Figure 12:
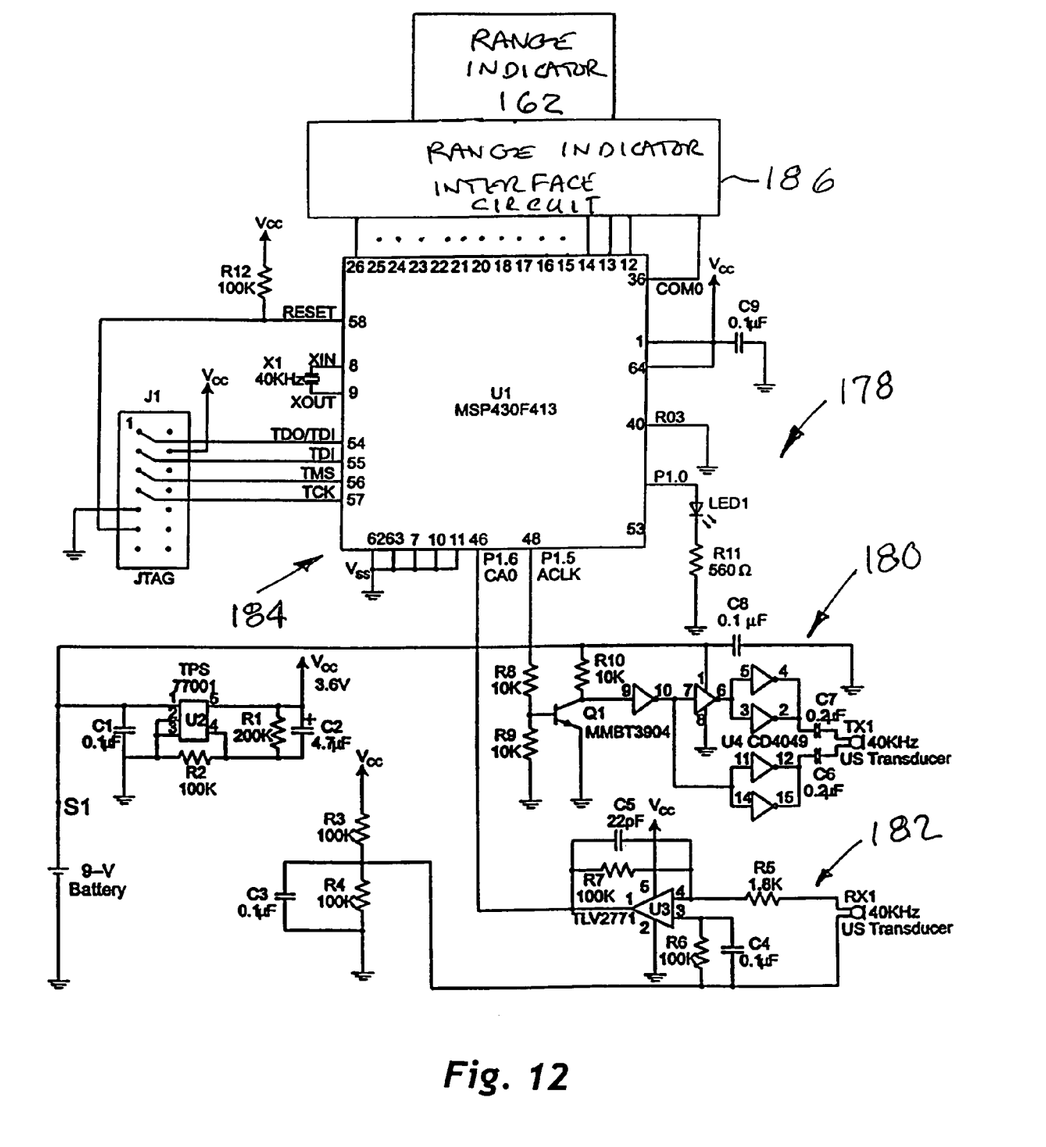
FIG. 12 is an electrical schematic for a first embodiment corresponding to the block diagram of FIG. 7.

Referring now to FIG. 12, an example circuit schematic 178 for the range finder 52' and range indicator 162 of the embodiment of FIG. 7. In the range finder 52' a transmitter and driver 180 sends an ultrasonic pulse from the gun to the target surface 60, and a receiver transducer and amplifier 182 "listens" for the return echo. A microprocessor 184 computes the distance 62 that the gun is away from the target surface by measuring the time the surface 60 takes to return the echo, and computing the distance based on the measured time, as is conventional in such ultrasonic range finder circuits. The microprocessor interfaces with the range indicator 162 via range indicator interface circuit 186, which is also conventional.

Figure 13:
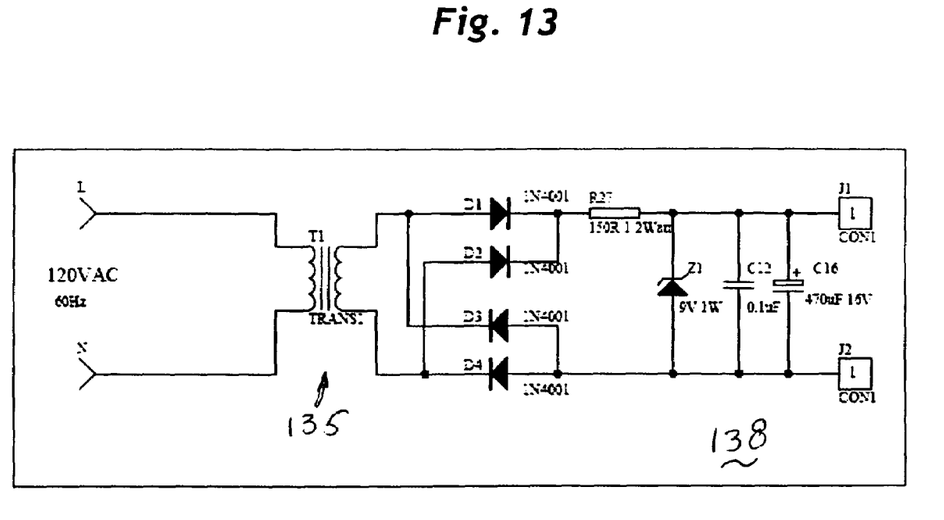
FIG. 13 is an electrical schematic for a second embodiment showing an input transformer and power supply circuit corresponding to the block diagram of FIG. 8.
Figure 14:
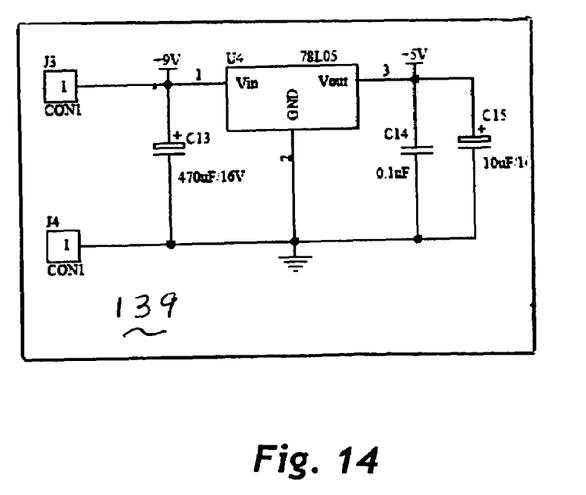
FIG. 14 is an electrical schematic for the second embodiment showing details of the voltage regulator of the block diagram of FIG. 8.
Figure 15:
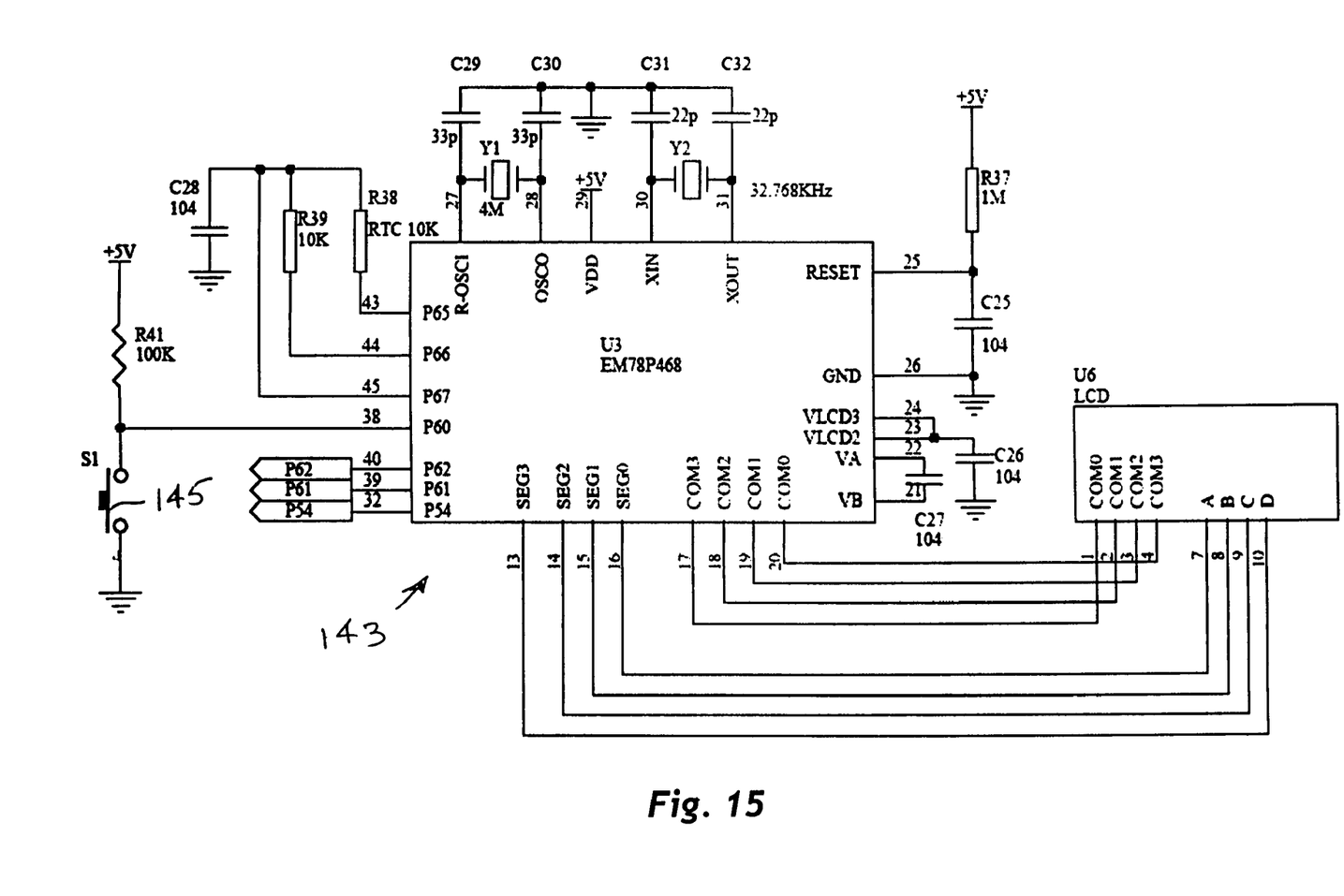
FIG. 15 is an electrical schematic for the second embodiment showing details of the control of the block diagram of FIG. 8.
Figure 16:
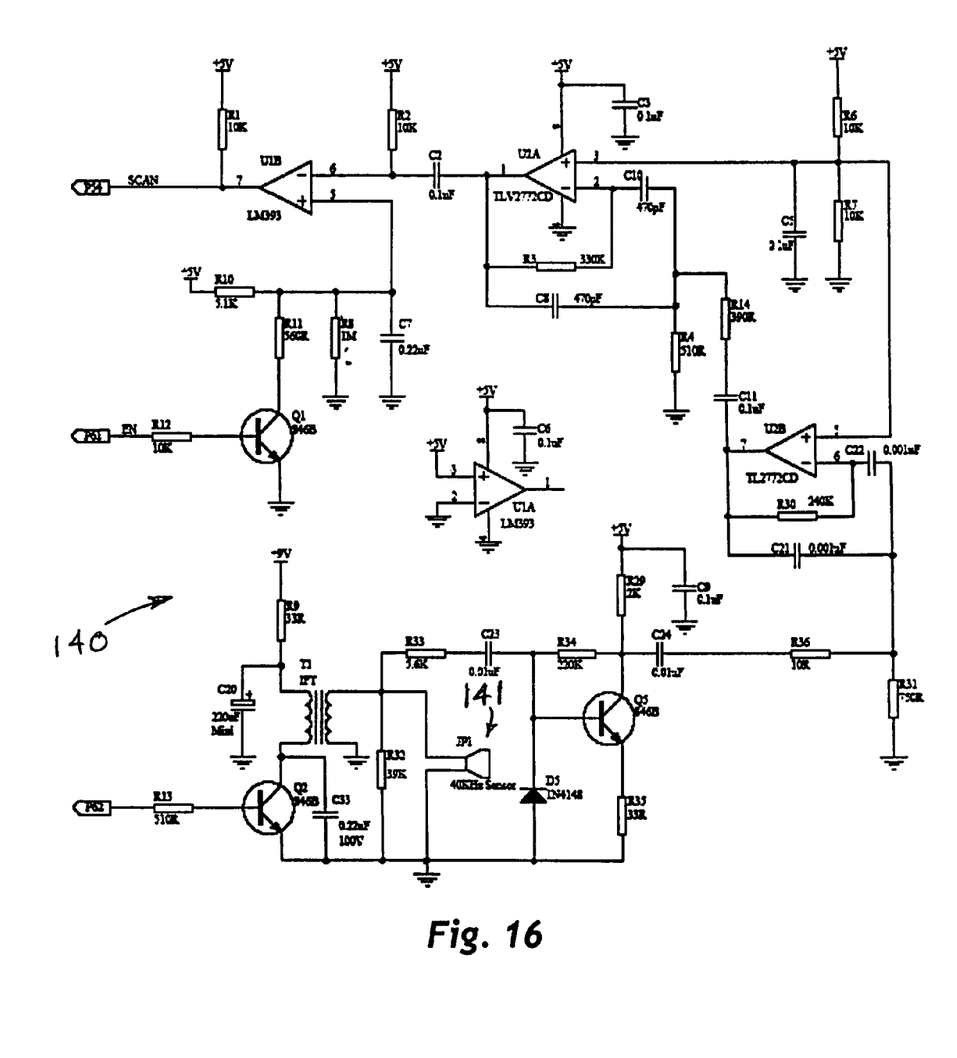
FIG. 16 is an electrical schematic for the second embodiment showing details of the driver circuit and sensor of the block diagram of FIG. 8.

FIGS. 13, 14, 15 and 16 show detailed electrical schematics corresponding to the block diagrams of FIGS. 7 and 8. FIG. 13 shows the transformer 135 and power supply circuit 138. FIG. 14 shows the voltage regulator 139. FIG. 15 shows the control circuit 143. FIG. 16 shows the driver circuit 140' and sensor or transceiver 141. The voltage regulator uses a type 78L05 integrated circuit to provide a regulated 5 VDC output. The control circuit uses a type EM78P486 microprocessor, available, for example, from Elan Microelectronics. The sensor or transceiver 141 may be a conventional 40 KHz ultrasonic device capable of both transmitting and receiving, such as a part number 400EP14D, available from Angus Technology, Ltd. (www.angus.com.hk; Workshop B, 7/f, Capital Trade Center, No. 62, Tsun Yip Street, Kwun Tong, Kowloon, Hong Kong).

This invention is not to be taken as limited to all of the details thereof as modifications and variations thereof may be made without departing from the spirit or scope of the invention.

The invention claimed is:

1. A paint spraying assembly for spraying paint and similar coatings on a target surface, the paint spraying assembly comprising:
   a paint spray gun;
   a sonic range finder on the paint spray gun;
   a readout display disposed on the paint spray gun and coupled to the sonic range finder, the readout display providing a visually perceptible image representing a distance between the paint spray gun and the target surface, enabling a user to position the paint spray gun at a desired distance from the target surface while spraying paint and similar coatings;
   wherein the visually perceptible image freezes when the paint spray gun is spraying.

2. The apparatus of claim 1 wherein the range finder provides a first visually perceptible image on the readout display when the paint spray gun is at the desired distance from the target surface.

3. The apparatus of claim 2 wherein the range finder provides a second visually perceptible image on the readout display when the paint spray gun is less than the desired distance from the target surface.

4. The apparatus of claim 3 wherein the range finder provides a third visually perceptible image on the readout display when the paint spray gun is more than the desired distance from the target surface.

5. The apparatus of claim 4 wherein each of the first, second, and third visually perceptible images displayed on the readout display are different from each other.

6. The apparatus of claim 1 wherein the range finder is active when the paint spray gun is connected to a source of electricity.

7. The apparatus of claim 1 wherein the readout display includes a first state indicative of the paint spray gun being positioned at the desired distance from the target surface.

8. The apparatus of claim 7 wherein the readout display includes a second state indicative of the paint spray gun being positioned at less than the desired distance from the target surface.

9. The apparatus of claim 8 wherein the readout display includes a third state indicative of the paint spray gun being positioned at greater than the desired distance from the target surface.

10. The apparatus of claim 1 wherein the readout display provides a display of an actual distance between the paint spray gun and the target surface.

11. The apparatus of claim 1 wherein the readout display comprises one or more optical indicators and the visually perceptible image comprises selective illumination of one or more states of the one or more optical indicators.

12. The apparatus of claim 11 wherein the readout display comprises at least one optical indicator having at least three visually distinguishable states, with each of the states corresponding to one of the positions of the gun at, closer to, or farther from the desired distance with respect to the target surface.

13. A spray gun system comprising:
   a. a spray gun;
   b. an ultrasonic range finder located in the spray gun and providing a signal indicative of a distance measured between the spray gun and a target surface at which the spray gun is aimed; and
   c. a range indicator connected to the signal provided by the ultrasonic range finder to provide a perceptible indication of the distance measured;
   wherein the perceptible indication provided by the ultrasonic range finder freezes when the spray gun is spraying.

14. The spray gun system of claim 13 wherein the range finder is active when the spray gun is connected to a source of electricity.

15. The spray gun system of claim 13 wherein the perceptible indication of the distance measured includes a first state corresponding to a condition wherein the distance measured equals a desired distance to the target surface.

16. The spray gun system of claim 15 wherein the perceptible indication of the distance measured includes a second state corresponding to a condition wherein the distance measured is less than a desired distance to the target surface.

17. The spray gun system of claim 15 wherein the perceptible indication of the distance measured includes a third state corresponding to a condition wherein the distance measured is greater than a desired distance to the target surface.

18. The spray gun system of claim 13 wherein the range indicator provides the perceptible indication in a visible form.

19. The spray gun system of claim 18 wherein the range indicator provides a visually perceptible digital display of the distance measured.

20. The spray gun system of claim 19 wherein the visually perceptible digital display is a numerical readout of the distance measured.

21. The spray gun system of claim 19 wherein the visually perceptible digital display is a bar graph display of the distance measured.

* * * * *